July 15, 1952     W. T. DUNN     2,603,322
VEHICLE BRAKE

Filed April 10, 1947     2 SHEETS—SHEET 1

INVENTOR.
William T. Dunn
BY
Harness and Harris
ATTORNEYS.

July 15, 1952 W. T. DUNN 2,603,322
VEHICLE BRAKE
Filed April 10, 1947 2 SHEETS—SHEET 2
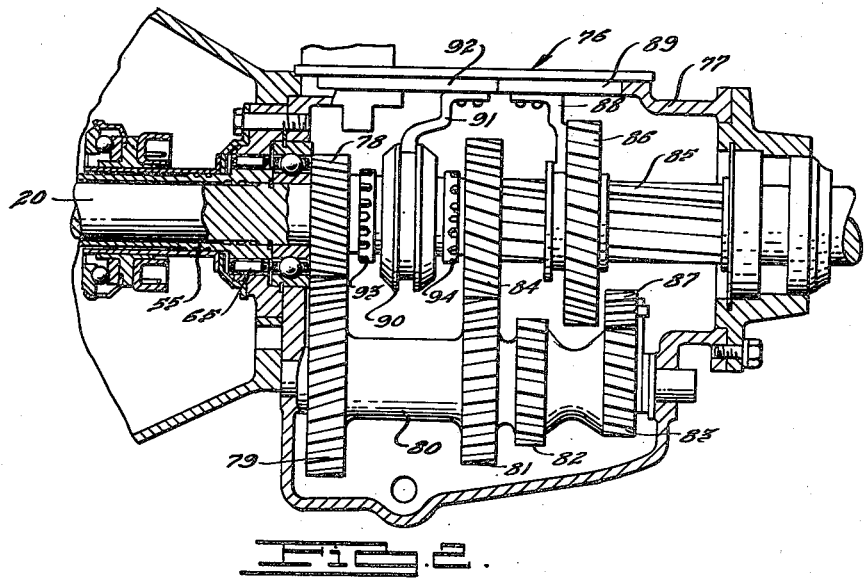
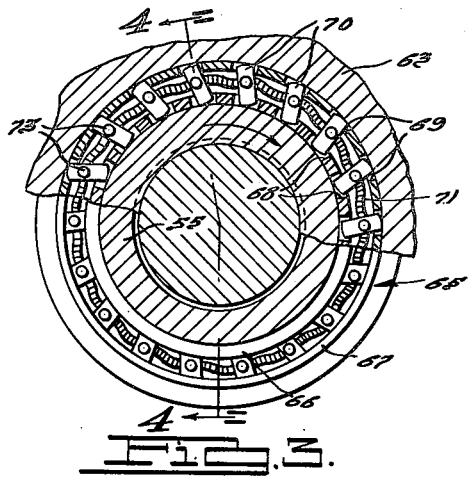
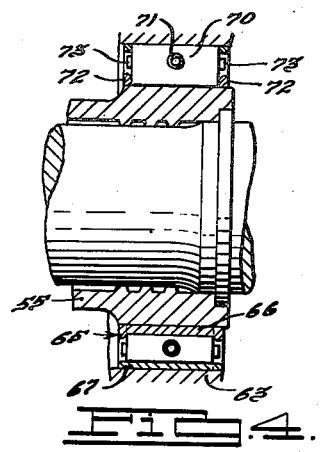
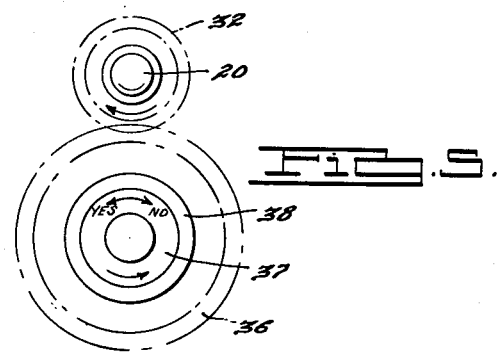
INVENTOR.
William T. Dunn.
BY
Harness and Harris
ATTORNEYS.

Patented July 15, 1952

2,603,322

UNITED STATES PATENT OFFICE 2,603,322

VEHICLE BRAKE

William T. Dunn, Detroit, Mich., assignor to Chrysler Corporation, Highland Park, Mich., a corporation of Delaware Application April 10, 1947, Serial No. 740,631

27 Claims. (Cl. 192—3.2)

This application relates to the association of a braking means with the driving means of a motor vehicle.

It is usual practice to provide a motor vehicle with a special brake that may be applied when the vehicle is parked or when the vehicle is being maneuvered on inclines. If this special brake is defective as may frequently be the case, there may be no way of holding the vehicle in the above cases. It has been customary to park a vehicle in gear, but the practice is subject to the drawback that the vehicle may move if the incline on which it is parked is sufficient to cause the engine to turn over. However, it is impossible to start the engine by a starter when the vehicle is in gear, and so it is impossible to hold the vehicle by its being in gear at a time when the engine is to be started. If the vehicle is provided with a fluid or slip-drive power transmitting device at some point between the driving wheels and the engine, the engine cannot be used to brake the car except to keep the vehicle below a speed at which the driven part of the slip-drive device will effectively attempt to drive the driving part. Accordingly, it becomes desirable to provide some supplementary braking means that will be effective under the conditions outlined above, and we have provided such a braking means.

An object of the present invention is to provide an improved braking means for a motor vehicle of a type that will prevent movement of the vehicle either forwards or backwards depending upon the selection made. The braking means may be associated with a conventional change-speed transmission in order to prevent forward movement or backward movement.

A further object is to associate a braking means that may take the form of a one-way brake with a main clutch of a motor vehicle so that the clutch may determine whether the braking means is to be operative.

Another object is to associate a one-way brake with a motor vehicle driven by an engine acting through a fluid coupling or similar drive transmitting device having a slip characteristic.

Still another object is to provide improvements in operating means for a clutch associated with a change-speed transmission as part of vehicle-propelling means and with a one-way brake acting with the clutch and transmission to hold the vehicle against movement as desired.

A still further object is to associate a one-way brake with a driving apparatus involving a fluid or slip-drive power-transmitting device whereby movement in a direction opposite to the direction of drive is prevented which movement might otherwise be possible because of the presence of the slip-drive power-transmitting device.

Other objects will appear from the disclosure.

Fig. 2 is a longitudinal sectional view of a driving means including a modified form of transmission, to which driving means the novel brake of the present invention is applied;

Fig. 3 is a sectional view taken on the line 3—3 of Fig. 1;

Fig. 4 is a sectional view taken on the line 4—4 of Fig. 3; and

Fig. 5 is a diagrammatic view taken along the line 5—5 of Fig. 1.

Figure 1:
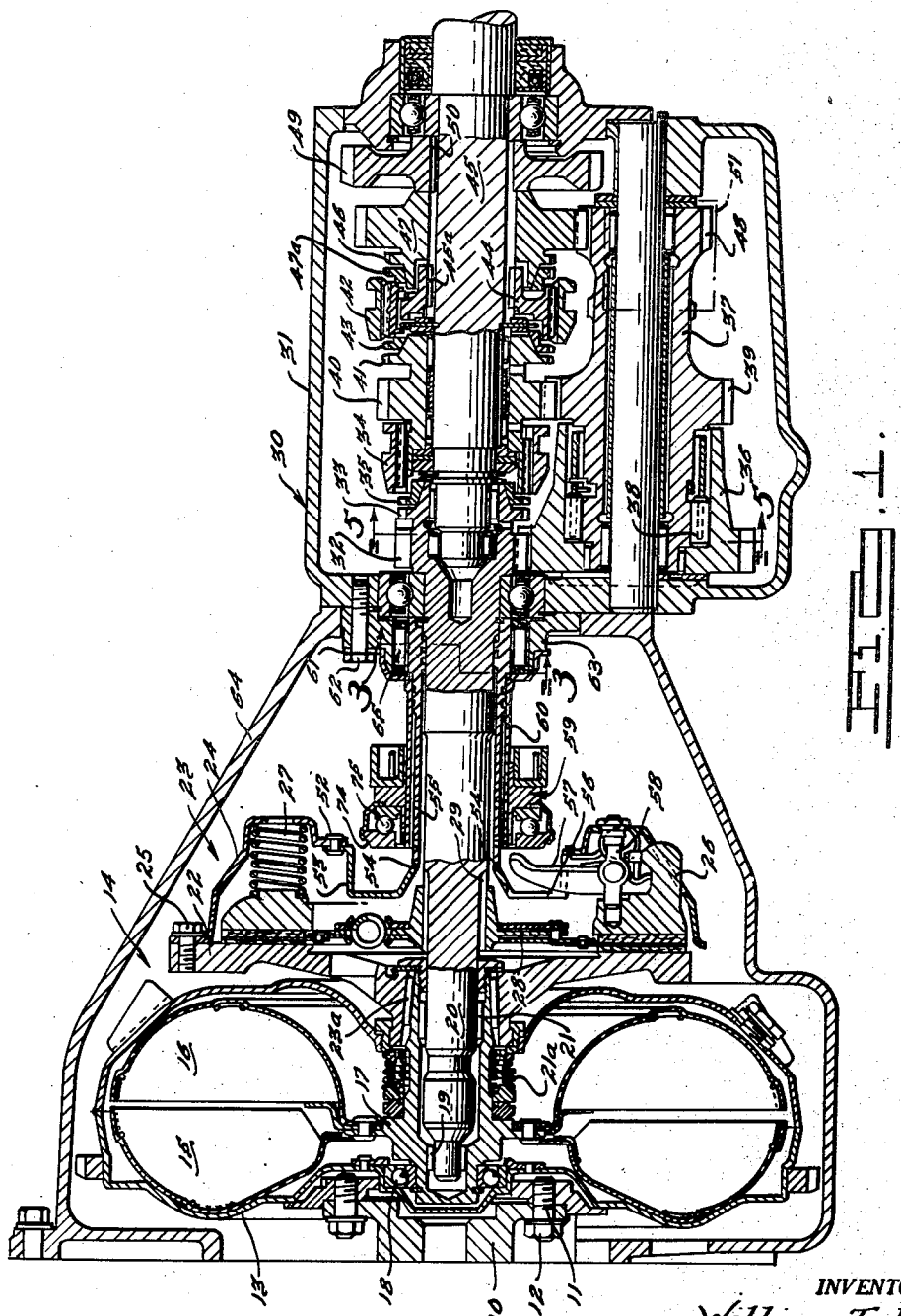
Fig. 1 is a longitudinal section of a driving means comprising a fluid coupling, a clutch, and a change speed transmission, with which driving means the novel brake of the present invention is associated.

The reference character 10 designates a driving shaft, which may be an engine driven shaft such as a crankshaft. The driving shaft 10 is connected by screws 11 and nuts 12 to a casing 13 of a fluid coupling 14. An impeller 15 is secured in suitable manner to the casing 13. A runner 16, positioned in juxtaposed relation to the impeller 15 is secured to a hub part 17. The hub part 17 is journalled at one end exteriorly by means of a ball bearing 18 on the impeller casing 13 and interiorly by means of roller bearings 19 upon the reduced end of a driven shaft 20. The other end of the hub member is journalled by roller bearings 21 upon the driven shaft 20. A seal 21ª acts between one end of the casing 13 and the hub part 17 to keep fluid within the casing. A hub member 22, forming part of the driving side of a clutch 23 is keyed as indicated at 23ª to the hub part 17. The driving side of the clutch 23 also includes a cover 24 secured by screws 25 to the hub member 22, and a pressure ring 26 urged by springs 27 toward the hub member 22, thereby causing the disc member 28 constituting the driven side of the clutch 23 to be clamped between the pressure ring 26 and the hub member 22. The disc member 28 is keyed or splined as indicated at 29 to the driven shaft 20. The driven shaft constitutes the input shaft of a transmission 30 including a casing 31. One end of the shaft 20 projects into the transmission casing 31 and has formed thereon a gear 32 and a toothed section 33 engageable by a driving sleeve 34. In the position of parts shown in Fig. 1 a synchronizer ring 35 is positioned between the toothed section 33 and the sleeve 34. The gear 32 continually meshes with a gear 36 which is mounted upon and drivingly connected to a compound gear 37 by means of a one-way clutch 38. The compound gear 37 has a gear section 39 continually meshing with a gear 40. One end of the gear 40 carries in slidable driving relation the sleeve 34, and the other end of the gear has a toothed section 41 engageable by a toothed sleeve 42, a synchronizer ring 43 being between the sleeve 42 and the toothed section 41. The sleeve 42 has a sliding driving connection with an intermediate driving member 44 keyed to an output shaft 45, as indicated at 45ª. The sleeve 42 is selectively engageable either with the toothed section 41 and the gear 40 or with a toothed section 46 upon a gear 47, there being a synchronizer ring 47ª between the toothed section 46 and the sleeve 42. The gear 47 continually meshes with a gear section 48 on the compound gear 37. A gear 49 is keyed as indicated at 50 to the output shaft 45. An idler gear 51, shown in dash-dot lines, continually meshes with the gear section 48 and is axially slidable into and out of engagement with the gear 49.

To the cover 24 of the clutch 23 is suitably secured, for example, by riveting 52 a channeled or reentrant ring member 53, which is radially inward of the cover 24. The ring member 53 is suitably secured, as by soldering or welding as indicated at 54, to one end of a sleeve 55 rotatably mounted upon the input shaft 20. The ring member 53 has apertures 56 through which extend the inner ends of radial release levers 57 mounted on fulcrum bolts 58 secured to the clutch cover 24. Only one aperture 56, lever 57, and fulcrum bolt 58 are shown. An actuating means 59 for the clutch 23 is slidably mounted on a sleeve 60 so as to be movable into engagement with the release levers 57. The sleeve 60 surrounds the sleeve 55 and has a flange 61, through which extend screws 62 securing the sleeve 60, the transmission casing 31, and a fitting 63 to one another. The fitting 63 is suitably secured in a clutch and fluid coupling housing 64. A one-way brake 65 acts between the fitting 63 and the right end of the sleeve 55.

The one-way brake 65 is shown in detail in Figs. 3 and 4. As seen in these figures, the brake includes inner and outer rings 66 and 67 having openings 68 and 69 respectively, a plurality of sprags or grippers 70, and an annular coil spring 71 extending through the sprags 70. The sprags project through the apertures 68 and 69 in the inner and outer rings 66 and 67 into immediate adjacency with the fitting 63 and the sleeve 55. The inner ring 66 has end flanges 72 retaining the grippers 70 against endwise movement. The ends of the grippers 70 are provided with rounded bearing portions 73 fitting losely between the outer ring 67 and the inner ring flanges 72, the grippers having limited tilting angular movement about the bearing portions 73. Fig. 3 shows the grippers 70 to be tilted slightly from radial positions, and the annular coil spring 71 yieldingly urges the grippers to radial positions. The inner and outer sides of the grippers 70 are appropriately curved so that when the sleeve 55 tends to rotate clockwise as indicated by the arrow in Fig. 3, there is no resistance to such rotation, for the grippers tilt as shown. If the sleeve 55 tends to rotate counterclockwise as viewed in Fig. 3, the grippers 70 move to more radial positions and thus grip the sleeve 55 and the fitting 63. Thereby relative rotation in one direction between the sleeve 55 and the fitting 63 is prevented due to the lock-up between these members effected by the clockwise tilting of the grippers 70.

The operation of the entire device of Fig. 1 is as follows. Assume that the engine or other driving means tends to rotate the driving shaft 10 in a clockwise direction if viewed in the direction of the arrows 3—3, designating the location of the sectional view of Fig. 3 in Fig. 1. The casing 13 and the impeller 15 of the fluid coupling 14 will also rotate, and when they have attained a sufficient speed they will cause rotation of the runner 16 through the action of the fluid contained in the fluid coupling. This causes the hub part 17, and the hub member 22 keyed thereto and forming part of the driving side of the clutch 23 to rotate. If the clutch 23 is engaged as it is shown to be in Fig. 1, the disc member 28 will also rotate causing the driven shaft 20 to rotate. The rotation of the driven shaft 20 which constitutes the input shaft of the transmission 30 is communicated in various ways to the output shaft 45 of the transmission through the gears contained in the transmission casing 31. Assume, for example, that the transmission gears are positioned as shown in Fig. 1, with the sleeve 34 so positioned as not to be in driving engagement with the toothed section 33 on the input shaft 20. Then drive is transmitted from the shaft 20 through the gear 32, the gear 36, the clutch 38, and the gear section 39 to the gear 40. If now the sleeve 42 is shifted to the left into engagement with the toothed section 41 on the gear 40, the gear 40 is directly connected to the output shaft 45. If a lower ratio of speed of output shaft 45 to speed of input shaft 20 is desired, the sleeve 42 is shifted to the right into engagement with the toothed section 46 on the gear 47. Then drive is transmitted from the input shaft 20 through the gear 32, the gear 36, the clutch 38, the gear section 48, the gear 47, and the sleeve 42 to the output shaft 45. The position of the sleeve 42 may be suitably manually controlled. The sleeve 34 may, for example, be controlled from the speed of the input shaft 20 through suitable means, not shown. When the speed of the input shaft 20 reaches a certain amount, the sleeve 34 will shift to the left, engaging the toothed section on the input shaft 20. Thus there is established a direct drive between the input shaft and the gear 40. If under these conditions it is desired to connect the output shaft 45 directly to the input shaft 20, the sleeve 42 is shifted to the left so as to effect a direct connection between the gear 40 and the output shaft 45. If with the gear 40 directly connected to the input shaft 20 it is desired to have the output shaft 45 rotate at a lower speed than the input shaft 20, the sleeve 42 is shifted to the right to connect the gear 47 to the output shaft 45. At this time drive of the input shaft 20 is transmitted through the toothed section 33, the sleeve 34, the gear 40, the gear section 39, the gear section 48, the gear 47, and the sleeve 42 to the output shaft 45. The one-way clutch 38 will permit the compound gear 37 to rotate faster than the gear 36 as is required when there is a direct drive between the input shaft 20 and the gear 40. When the speed of the input shaft 20 falls below a certain value, the sleeve 34 will automatically shift to the right, causing a resumption of the driving conditions originally described. When it is desired to reverse the direction of the output shaft 45, the idler gear 51 is axially shifted to the right into engagement with the gear 49. Then drive is transmitted from the input shaft 20 through the gear 32, the gear 36, the clutch 38, the gear section 48, the idler gear 51, and the gear 49 to the output shaft 45. Conceivably, when the transmission is in reverse, the speed of the shaft 20 may become sufficiently high to cause the sleeve 34 to become engaged with the toothed section on the gear 32. Then drive will be transmitted from the input shaft 20 to the output shaft 45 through the gear 32, the sleeve 34, the gear 40, the gear section 39, the gear section 48, the idler gear 51, and the gear 49.

The manner of operation of the one-way clutch 38 is best seen in Fig. 5. In this figure the input shaft 20 and the gear 32 formed thereon are rotating in a clockwise direction and thus cause the gear 36 to rotate in a counterclockwise direction. The clutch 38 is so constructed that as indicated in the yes-no designation in Fig. 5, the compound gear 37 may rotate with respect to the gear 36 in a counterclockwise direction but may not rotate with respect to it in a clockwise direction. Thus the compound gear 37 may rotate faster than but not slower than the gear 36 in a counterclockwise direction. If the gear section 37 rotates in a clockwise direction, it will cause a clockwise rotation of the gear 36.

If drive is to be transmitted through the transmission 30, it is necessary that the input shaft 20 be drivingly connected with the driving shaft 10 through the clutch 23, and Fig. 1 shows the parts of the clutch 23 so positioned as to cause the input shaft to be so driven. When the input shaft 20 is not to be driven, the clutch 23 is disengaged by movement to the left of actuating control means 59. This causes a ring 74 forming part of the actuating means and journalled with respect to the rest of the actuating means by a ball bearing 75, to engage and shift the inner ends of the levers 57 to the left. This results in a rightward movement of the outer ends of the levers 57 which engage the pressure ring 26 and cause it to be shifted to the right against the action of the springs 27. This releases the disc member from driving engagement with the hub member 22 of the clutch. When for disengagement of the clutch 23, the actuating means 59 is moved to the left as viewed in Fig. 1, the channeled or reentrant shape of the ring 53 permits such movement to take place, for the ring 74 on the actuating means 59 may enter the channel of the ring 59 as the ring 74 urges the inner ends of the release levers 57 to the left. Because the channeled ring 53 has openings 56 through which the inner ends of the levers 57 project, the levers are in position to be acted upon by the ring 74 of the actuating means 59.

Let us now consider the desired function and purpose of the one-way brake 65 of Figs. 3 and 4. If the vehicle in which the driving means is mounted is parked on an incline such as to cause the vehicle to roll backwards, and it is impossible or undesirable to use a special brake to prevent such backward movement, the engine alone cannot be relied upon to prevent the backward movement, for the runner 16 of the fluid coupling 14 may rotate at low speeds with respect to the impeller 15. The one-way brake 65 will prevent such backward movement in the following manner. Backward movement of the vehicle would cause the output shaft 45 of the transmission to rotate in a counterclockwise direction if viewed in the direction of the arrows 3—3 and 5—5 of Fig. 1. If now the sleeve 42 engages either the toothed section 46 of the gear 47 or the toothed section 41 of the gear 40, the counterclockwise rotation of the output shaft 45 tending to be produced by the backward movement of the vehicle would result in clockwise rotation of the compound gear 37. Since, as seen in Fig. 5, the one-way clutch 38 will prevent clockwise movement of the compound gear 37 with respect to the gear 36 there will be a tendency for clockwise movement of the gear 36 to be produced. This will result in an attempted counterclockwise movement of the gear 32 and the input shaft 20, which will be transmitted through the clutch 23, if engaged, to the sleeve 55. As was previously explained and is self-evident from Fig. 3, counterclockwise movement of the sleeve 55 cannot take place, because the sprags 70 move to more nearly radial positions, gripping the fitting 63 and the sleeve 55 and preventing movement between them. If it is desired to permit the aforementioned backward movement of the vehicle, the clutch 23 may be disengaged, and thereby the input shaft 20 is freed from the sleeve 55. It may be desirable to prevent backward movement of the vehicle at other times than when the vehicle is parked. For example, the vehicle may be temporarily stopped in traffic under conditions that would make it impossible to speed the engine sufficiently to cause the impeller 15 of the fluid coupling to rotate fast enough in a clockwise direction to prevent counterclockwise movement of the runner 16. It is only required that the clutch 23 be engaged and that the sleeve 42 be in one of its engaged positions.

If the sleeve 34 engages the toothed section 33 associated with gear 32 formed on input shaft 20, then backward movement of the vehicle would produce counterclockwise movement of the output shaft 45, which would produce counterclockwise movement of the input shaft 20, either directly with the sleeve 42 engaging the toothed section 41 on the gear 40, or indirectly with the sleeve 42 engaging the loothed section 48 on the gear 47. Such counterclockwise movement of the input shaft would with the clutch 23 engaged produce counterclockwise movement of the sleeve 55, which is prevented by the one-way brake 65, as previously described.

If the vehicle is on an incline such as would cause it to move forward, this may be prevented through engagement of the idler gear 51 with the gear 49 and engagement of the clutch 23. Forward movement of the vehicle would result in clockwise rotation of the output shaft 45, which would be transmitted through the gears 49 and 51 as clockwise rotation to the compound gear 37. As previously described, the one-way clutch 38 will not permit clockwise rotation of the compound gear 37 without clockwise rotation of the gear 36. Clockwise rotation of the gear 36 would result in counterclockwise rotation of the gear 32 and the input shaft 20, and with the clutch 23 engaged counterclockwise rotation of the sleeve 55 would result. However, this is impossible, as was previously described.

Fig. 2 shows the one-way brake 65 in use with a different form of change speed transmission which is hereby designated with the reference character 76. A transmission casing 77 is provided in which is positioned a gear 78 formed on the end of the driven or input shaft 20. The gear 78 continuously meshes with a gear section 79 forming part of a compound gear 80 which also includes gear sections 81, 82, and 83. The gear section 81 continuously meshes with a gear 84 rotatably supported upon a transmission output shaft 85. A gear 86 is slidably and drivingly connected with the output shaft 85 so as to mesh either with the gear section 82 or with idler gear 87 continuously meshing with the gear section 83. The position of the gear 86 is controlled by a fork 88 attached to a rail 89. When the gear 86 engages the gear section 82, the transmission 76 is in the first or low gear, drive being transmitted from the input shaft 20 through the gear 78, the gear section 79, the gear section 82, and the gear 86 to the output shaft 85. When the gear 86 meshes with the idler gear 87, the transmission is in reverse, the shaft 85 rotating in a counterclockwise direction when viewed from left to right if the input shaft 20 rotates in a clockwise direction. In this condition drive is transmitted from the input shaft 20 through the gear 78, the gear section 79, the gear section 83, the idler gear 87, and the gear 86 to the output shaft 85. Positioned between the gears 78 and 89 is a shifting member 90 controlled by a fork 91 attached to a rail 92. The shifting member 90 has at one end a clutching section 93 engageable with a mating clutching section formed on the end of the input shaft 20, not shown. A clutching section 94 is formed on the other end of the shifting member 84 and is adapted to mesh with a mating clutching section, not shown, formed on the gear 84. The shifting member 90 has slidable driving engagement with the output shaft 85. When the shifting member 90 is moved to the right so that the clutching section 94 engages the clutching section formed on the gear 84, the transmission 76 is in the second or intermediate gear, drive being transmitted from the input shaft 20 through the gear 78, the gear section 79, the gear section 81, the gear 84, and the shifting member 90 to the output shaft 85. When the member 90 is moved to the left, the clutching section 93 engages the clutching section formed on the end of the input shaft 20, and the transmission is in third or direct or high gear, the input shaft being directly connected to the output shaft 85 through the member 90 and thereby causing the output shaft 85 to rotate at the same speed as the input shaft 20.

The one-way brake 65 functions with the transmission 76 of Fig. 2 in the manner described for Fig. 1. If backward movement of the vehicle is to be prevented, the clutch connecting the fluid coupling and the input shaft 20 is engaged, and the member 90 is shifted to the right or to the left so as to be engaged either with gear 84 or with gear 78, or the gear 86 is shifted to the left into engagement with the gear section 82. Thus counterclockwise rotation of the output shaft 79 tending to be produced by backward movement of the vehicle would cause counterclockwise movement of the input shaft 20 and of the sleeve 55. However, the one-way brake 65 prevents counterclockwise movement of the sleeve 55 and thereby prevents counterclockwise movement of the input shaft 20 and the output shaft 85 and backward movement of the vehicle. When backward movement of the vehicle is to be allowed, the clutch is disengaged, and the input shaft 20 may rotate in a counterclockwise direction independently of the sleeve 53. If forward movement of the vehicle is to be prevented, the gear 86 is shifted into engagement with the idler gear 87. Forward movement of the vehicle would result in clockwise movement of the output shaft 85, which would be transmitted through the gear 86, the idler gear 87, the gear section 83, the gear section 79, and the gear 78 as counterclockwise rotation of the input shaft 20. Since engagement of the clutch prevents relative rotation between the input shaft 20 and the sleeve 55, the one-way brake 60 will prevent counterclockwise rotation of the input shaft 20. If the vehicle is to be allowed to move forwardly, the clutch is disengaged.

I claim:

1. The combination with an engine, a change-speed transmission having an input shaft, an output shaft and means adapted to drivingly connect said shafts so that said output shaft can be selectively rotated in either the same direction as the input shaft or in a direction opposite to that of the input shaft, and a clutch having a driving side adapted to be drivingly connected with the engine and a driven side adapted to be drivingly connected with the input shaft of the transmission; of a one-way brake associated with the driving side of the clutch for preventing, during engagement of the clutch, the output shaft from rotating the input shaft in a direction opposite to that produced by normal engine operation or in the second drive-transmitting arrangement, said one-way brake comprising a plurality of grippers and an annular coil spring extending therethrough for providing a resilient displaceable mounting for the grippers.

2. The combination with an engine, a change-speed transmission comprising a casing, an input shaft projecting from the casing, an output shaft, and gearing connecting the input shaft and output shaft for providing a first drive-transmitting arrangement involving rotation of the output shaft in one direction for a given direction of rotation of the input shaft and a second drive-transmitting arrangement involving rotation of the output shaft in the opposite direction for the said given direction of rotation of the input shaft, a clutch comprising a driving side and a driven side drivingly connected with the input shaft, and a fluid power-transmitting device connecting the engine and the driving side of the clutch; of a sleeve surrounding a portion of the input shaft outside of the transmission casing and drivingly connected with the driving side of the clutch, and a one-way brake acting between the sleeve and the transmission casing for preventing rotation of the input shaft opposite to the given direction of rotation during engagement of the clutch, said one-way brake comprising a plurality of sprags engageable with the sleeve and the transmission casing and an annular coil spring passing through the sprags so as yieldingly to hold the sprags in engagement with the sleeve and the transmission casing.

3. The combination with an engine, a change-speed transmission comprising a casing, an input shaft projecting from the casing, an output shaft, and gearing connecting the input shaft and output shaft for providing a first drive-transmitting arrangement involving rotation of the output shaft in one direction for a given direction of rotation of the input shaft and a second drive-transmitting arrangement involving rotation of the output shaft in the opposite direction for the said given direction of rotation of the input shaft, a clutch comprising a driving side and a driven side drivingly connected with the input shaft, and a fluid power-transmitting device connecting the engine and the driving side of the clutch; of a first sleeve surrounding a portion of the input shaft outside of the transmission casing and drivingly connected with the driving side of the clutch, a second sleeve surrounding the first sleeve and being attached to the transmission casing, means adjustably mounted on the second sleeve for shifting the driven side of the clutch with respect to the driving side thereof for producing engagement and disengagement of the clutch, and a one-way brake acting between the first sleeve and the transmission casing for preventing during engagement of the clutch rotation of the input shaft in a direction opposed to the said given direction, said one-way brake comprising inner and outer apertured rings fitting around and within the first and second sleeves, respectively, a plurality of sprags each positioned in an aperture, in each ring and engageable with the sleeves, and an annular coil spring extending through the sprags so as yieldingly to maintain them in engagement with the sleeves.

4. In combination, a driving shaft, a driven shaft, a clutch having a driving side and a driven side connected with the driven shaft, a fluid device transmitting drive from the driving shaft to the driving side of the clutch, and a one-way brake comprising a plurality of sprags and an annular coil spring extending through the sprags, the one-way brake being associated with the driving side of the clutch for preventing drive of the driven shaft in one direction during engagement of the clutch.

5. The combination with a shaft and driving means therefor comprising a fluid power-transmitting device and a clutch having a driving side connected with the fluid power-transmitting device and a driven side connected with the shaft; of a holding device for preventing rotation of the shaft in one direction during engagement of the clutch, said holding device comprising a one-way brake formed of sprags and an annular coil spring extending therethrough, and a sleeve surrounding the shaft and connecting the one-way brake and the driving side of the clutch.

6. The combination with a fluid power-transmitting device, a clutch comprising a driving side connected with the device and having a cover and a driven side comprising a disc positioned interiorly of the cover for the driving side, and a shaft projecting through the fluid power-transmitting device and the clutch and having driving engagement with the disc thereof; of a holding device for preventing rotation of the shaft in one direction during engagement of the clutch, said holding device comprising a one-way brake formed of sprags and an annular coil spring and a sleeve surrounding the shaft and connecting the one-way brake and the clutch cover.

7. In combination, a clutch having a driven side formed of a disc, and a driving side formed of a hub member, a cover attached to the hub member, a pressure ring, springs acting between the cover and the pressure ring to cause the latter to maintain the driven disc in driving engagement with the hub member, and a plurality of radial release levers associated with the pressure ring and the cover, a shaft having splined engagement with the driven disc and projecting from the clutch, fixed means including a first sleeve fixed to the casing and surrounding the shaft in spaced relation thereto, clutch control means slidably mounted on the first sleeve and engageable with the inner ends of the radial release levers for causing the levers to move the pressure ring against the springs to release the driven disc from driving engagement with the hub member, a second sleeve surrounding the shaft within the first sleeve, a one-way brake acting between the fixed means and the first sleeve, and structure connecting the second sleeve and the clutch cover for causing the one-way brake to prevent rotation of the shaft in one direction during engagement of the clutch, the structure having openings receiving the inner ends of the clutch release levers and having the form of a channel to provide room for movement of the clutch control means against the inner ends of the release lever.

8. In combination, a clutch having a driven side formed of a hub member, a cover secured to the hub member, release elements for controlling driving engagement between the driving and driven sides, actuating means engageable with the release elements, a shaft drivingly engaged with the driven disc and projecting from the clutch, a fixed means, a sleeve surrounding the shaft, a one-way brake acting between the fixed means and the sleeve and structure connecting the sleeve and the cover so as to cause the one-way brake to prevent rotation of the shaft in one direction during engagement of the clutch, the structure having openings receiving the ends of the release elements and having a reentrant shape providing room for movement of the actuating means against the release elements.

9. In combination, a clutch having a driven side and a driving side housing the driven side and carrying means for controlling driving engagement of the driving and driven sides, actuating means engageable with the controlling means, a shaft drivingly engaging the driven side of the clutch and projecting from the clutch, a fixed means, a sleeve surrounding the shaft, a one-way brake acting between the sleeve and the fixed means, and structure connecting the sleeve and the driving side of the clutch for preventing rotation of the shaft in one direction during engagement of the clutch, the structure being apertured to receive the controlling means and being of reentrant shape to provide room for movement of the actuating means against the controlling means.

10. In combination, a clutch having a driven side and a driving side housing the driven side and carrying means for controlling driving engagement of the driving and driven sides, actuating means engageable with the controlling means, a shaft drivingly engaging the driven side of the clutch and projecting from the clutch, a fixed means including a first sleeve surrounding the shaft in spaced relation thereto and providing a support for the actuating means, a second sleeve surrounding the shaft and positioned within the first sleeve, a one-way brake acting between the second sleeve and the fixed means, and structure connecting the second sleeve and the driving side of the clutch for preventing rotation of the shaft in one direction during engagement of the clutch, the structure being apertured to receive the controlling means and being of reentrant shape to provide room for movement of the actuating means against the controlling means.

11. In combination, a fluid power-transmitting device, a clutch having a driven side formed of a disc, and a driving side formed of a hub member connected with the fluid device, a cover attached to the hub member, a pressure ring, springs acting between the cover and the pressure ring to cause the latter to maintain the driven disc in driving engagement with the hub member, and a plurality of radial release levers associated with the pressure ring and the cover, a shaft having splined engagement with the driven disc and projecting from the clutch, fixed means including a first sleeve surrounding the shaft in spaced relation thereto, clutch-actuating means slidably mounted on the first sleeve and engageable with the inner ends of the radial release levers for causing the levers to move the pressure ring against the springs to release the driven disc from driving engagement with the hub member, a second sleeve surrounding the shaft within the first sleeve, a one-way brake acting between the fixed means and the first sleeve, and structure connecting the second sleeve and the clutch cover for causing the one-way brake to prevent rotation of the shaft in one direction during engagement of the clutch, the structure having openings receiving the inner ends of the clutch release levers and having the form of a channel to provide room for movement of the clutch-actuating means against the inner ends of the release lever.

12. In combination, a clutch having a driven side formed of a disc, and a driving side formed of a hub member, a cover attached to the hub member, a pressure ring, springs acting between the cover and the pressure ring to cause the latter to maintain the driven disc in driving engagement with the hub member, and a plurality of radial release levers associated with the pressure ring and the cover, a shaft having splined engagement with the driven disc and projecting from the clutch, fixed means including a first sleeve surrounding the shaft in spaced relation thereto, clutch-actuating means slidably mounted on the first sleeve and engageable with the inner ends of the radial release levers for causing the levers to move the pressure ring against the springs to release the driven disc from driving engagement with the hub member, a second sleeve surrounding the shaft within the first sleeve, a one-way brake comprising inner and outer apertured rings, an annular coil spring, and a plurality of grippers apertured to receive the annular coil spring and fitting in the apertures in the rings so as to act against the fixed means and the first sleeve, and structure connecting the second sleeve and the clutch cover for causing the one-way brake to prevent rotation of the shaft in one direction during engagement of the clutch, the structure having openings receiving the inner ends of the clutch release levers and having the form of a channel to provide room for movement of the clutch-actuating means against the inner ends of the release lever.

13. In combination, a clutch having a driven side and a driving side housing the driven side and carrying means for controlling driving engagement of the driving and driven sides, actuating means engageable with the controlling means, a shaft drivingly engaging the driven side of the clutch and projecting from the clutch, a fixed means, a sleeve surrounding the shaft, a one-way brake comprising an annular coil spring and a plurality of grippers receiving the annular coil spring and acting against the sleeve and the fixed means, and structure connecting the sleeve and the driving side of the clutch for preventing rotation of the shaft in one direction during engagement of the clutch, the structure being apertured to receive the controlling means and being of reentrant shape to provide room for movement of the actuating means against the controlling means.

14. In combination, a clutch having a driven side and a driving side housing the driven side and carrying means for controlling driving engagement of the driving and driven sides, actuating means engageable with the controlling means, a shaft drivingly engaging the driven side of the clutch and projecting from the clutch, a fixed means including a first sleeve surrounding the shaft in spaced relation thereto and providing a sliding support for the actuating means, a second sleeve surrounding the shaft and positioned within the first sleeve, a one-way brake comprising an annular coil spring and a plurality of grippers receiving the spring and acting against the second sleeve and the fixed means, and structure connecting the second sleeve and the driving side of the clutch for preventing rotation of the shaft in one direction during engagement of the clutch, the structure being apertured to receive the controlling means and being of a reentrant shape to provide room for movement of the actuating means against the controlling means.

15. In combination, a fluid power-transmitting device, a clutch having a driven side formed of a disc, and a driving side formed of a hub member connected with the fluid device, a cover secured to the hub member, release elements for controlling driving engagement between the driving and driven sides, actuating means engageable with the release elements, a shaft drivingly engaged with the driven disc and projecting from the clutch, a fixed means, a sleeve surrounding the shaft, a one-way brake acting between the fixed means and the sleeve, and structure connecting the sleeve and the cover so as to cause the one-way brake to prevent rotation of the shaft in one direction during engagement of the clutch, the structure having openings receiving the ends of the release elements and having a reentrant shape providing room for movement of the actuating means against the release elements.

16. In combination, a fluid power-transmitting device, a clutch having a driven side formed of a disc, and a driving side formed of a hub member connected with the fluid device, a cover secured to the hub member, release elements for controlling driving engagement between the driving and driven sides, actuating means engageable with the release elements, a shaft drivingly engaged with the driven disc and projecting from the clutch, a fixed means, a sleeve surrounding the shaft, a one-way brake comprising a plurality of sprags acting between the fixed means and the sleeve and an annular coil spring passing through the sprags, and structure connecting the sleeve and the cover so as to cause the one-way brake to prevent rotation of the shaft in one direction during engagement of the clutch, the structure having openings receiving the ends of the release elements and having a reentrant shape providing room for movement of the actuating means against the release elements.

17. In combination, an engine, a change-speed transmission comprising a casing, an input shaft projecting from the casing, an output shaft, and gearing connecting the input shaft and output shaft for providing a drive transmitting arrangement involving rotation of the output shaft in one direction for a given direction of rotation of the input shaft and a second drive-transmitting arrangement involving rotation of the output shaft in the opposite direction from the said given direction of rotation of the input shaft, a clutch having a driven side formed of a disc, and a driving side formed of a hub member, a cover secured to the hub member, release elements for controlling driving engagement between the driving and driven sides, actuating means engageable with the release elements, a fluid power-transmitting device connecting the engine and the driving side of the clutch, means drivingly connecting the input shaft and the driven disc of the clutch, a one-way brake comprising a plurality of sprags acting against the transmission casing and the sleeve and an annular coil spring extending through the sprags, and structure connecting the sleeve and the clutch cover so as to cause the one-way brake to prevent rotation of the input shaft in one direction during engagement of the clutch, whereby the output shaft is held against rotation in the said one direction when the transmission gearing interconnects the input and output shafts for providing the aforesaid first drive-transmitting arrangements, and is held against rotation in a direction opposed to the said one direction when the transmission gearing interconnecting the shafts provides the second drive-transmitting arrangements, the structure having openings receiving the ends of the release elements and having a reentrant shape providing room for movement of the actuating means against the release elements.

18. In combination, a fluid power-transmitting device, a clutch having a driven side, and a driving side connected with the fluid device and housing the driven side and carrying means for controlling driving engagement of the driving and driven sides, actuating means engageable with the controlling means, a shaft drivingly engaging the driven side of the clutch and projecting from the clutch, a fixed means, a sleeve surrounding the shaft, a one-way brake acting between the sleeve and the fixed means, and structure connecting the sleeve and the driving side of the clutch for preventing rotation of the shaft in one direction during engagement of the clutch, the structure being apertured to receive the controlling means and being of reentrant shape to provide room for movement of the actuating means against the controlling means.

19. In combination, a fluid power-transmitting device, a clutch having a driven side, and a driving side connected with the fluid device and housing the driven side and carrying means for controlling driving engagement of the driving and driven sides, actuating means engageable with the controlling means, a shaft drivingly engaging the driven side of the clutch and projecting from the clutch, a fixed means, a sleeve surrounding the shaft, a one-way brake comprising sprags acting against the sleeve and the fixed means and an annular coil spring extending through the sprags, and structure connecting the sleeve and the driving side of the clutch for preventing rotation of the shaft in one direction during engagement of the clutch, the structure being apertured to receive the controlling means and being of reenrant shape to provide room for movement of the actuating means against the controlling means.

20. In combination, an engine, a clutch having a driven side and a driving side housing the driven side and carrying means for controlling engagement of the driving and driven sides, actuating means engageable with the controlling means, a fluid power-transmitting device connecting the engine to the driving side of the clutch, a change-speed transmission comprising a casing, an input shaft, an output shaft, and gearing interconnecting the input and output shafts for causing rotation of the output shaft in the same and opposite directions as the input shaft, means drivingly connecting the driven side of the clutch and the input shaft, a sleeve surrounding the input shaft, a one-way brake acting between the sleeve and the transmission casing, and structure connecting the sleeve and the driving side of the clutch for preventing rotation of the input shaft in one direction during engagement of the clutch, the structure being apertured to receive the controlling means and being of reentrant shape to provide room for movement of the actuating means against the control means.

21. In combination, a fluid power-transmitting device, a clutch having a driven side and a driving side connected with the fluid device and housing the driven side and carrying means for controlling driving engagement of the driving and driven sides, a shaft drivingly engaging the driven side of the clutch and projecting from the clutch, a fixed means including a first sleeve surrounding the shaft in spaced relation thereto and providing a support for the actuating means, a second sleeve surrounding the shaft and positioned within the first sleeve, a one-way brake acting between the second sleeve and the fixed means, and structure connecting the second sleeve and the driving side of the clutch for preventing rotation of the shaft in one direction during engagement of the clutch, the structure being apertured to receive the controlling means and being of reentrant shape to provide room for movement of the actuating means against the controlling means.

22. In combination, a fluid power-transmitting device, a clutch having a driven side and a driving side connected with the fluid device and housing the driven side and carrying means for controlling driving engagement of the driving and driven sides, a shaft drivingly engaging the driven side of the clutch and projecting from the clutch, a fixed means including a first sleeve surrounding the shaft in spaced relation thereto and providing a support for the actuating means, a second sleeve surrounding the shaft and positioned within the first sleeve, a one-way brake comprising a plurality of sprags acting against the fixed means and the second sleeve and an annular coil spring extending through the sprags, and structure connecting the second sleeve and the driving side of the clutch for preventing rotation of the shaft in one direction during engagement of the clutch, the structure being apertured to receive the controlling means and being of reentrant shape to provide room for movement of the actuating means against the controlling means.

23. In combination, an engine, a transmission having a casing, an input shaft, an output shaft, and means connecting the input and output shafts in arrangements involving a plurality of speed ratios of output shaft to input shaft and rotation of the output shaft in the same direction as the input shaft and in the opposite direction, a clutch having a driven side and a driving side housing the driven side and carrying means for controlling driving engagement of the driving and driven sides, actuating means engageable with the controlling means, a fluid power-transmitting device drivingly connecting the engine and the driving side of the clutch means drivingly connecting the input shaft and the driven side of the clutch, a first sleeve fixed to the transmission casing in surrounding relation to the input shaft and providing a support for the actuating means, a second sleeve surrounding the input shaft and positioned within the first sleeve, a one-way brake comprising inner and outer apertured rings, an annular coil spring between the rings, and a plurality of grippers receiving the spring and fitting in the apertures in the inner and outer rings for engagement with the transmission casing and the second sleeve, and structure connecting the secing sleeve and the driving side of the clutch for causing the one-way brake during engagement of the clutch to hold the input shaft against rotation in one direction and thereby to hold the output shaft against rotation in the said one direction or in the opposite direction depending upon the setting of the transmission, the structure being apertured to receive the clutch-controlling means and being of reentrant shape for providing room for movement of the actuating means against the controlling means.

24. In combination, a drive transmitting device having a slip characteristic, a driven member, clutch means adapted to drivingly connect said drive transmitting device and said driven member comprising a driving side connected to said drive transmitting device and a driven side connected to said driven member, and a one-way brake device operatively engaged with the driving side of said clutch means adapted to prevent said driven member from driving said drive transmitting device in one direction when said clutch means is engaged, said one-way brake including a plurality of resiliently interconnected sprags.

25. In combination, an engine-driven shaft and a gear type power transmission unit interconnected by drive transmitting means including a slip-drive power transmitting device, a manually operable clutch included in the means drivingly interconnecting the slip-drive power transmitting device and the power transmission unit, said clutch comprising engageable driving and driven parts, and a one-way brake connected to the driving part of said clutch and controlled thereby and arranged to prevent rotation of the aforementioned drive transmitting means in one direction when the clutch is engaged, said one-way brake including a plurality of grippers and an annular coil spring interconnecting the grippers.

26. The combination with an engine, a transmission having an input shaft, an output shaft and means adapted to drivingly connect said shafts so that said output shaft can be selectively rotated in either the same direction as the input shaft or in a direction opposite to that of the input shaft, a slip-drive power-transmitting device, means drivingly connecting the engine and the slip-drive power-transmitting device, disconnectible clutch means comprising driving and driven parts drivingly connecting the slip drive power-transmitting device to the input shaft of the transmission; of a one-way brake engageable with the driving part of the clutch means so as to have the operability of the brake controlled by the drive transmitting condition of said clutch means whereby the output shaft of the transmission may be selectively prevented from rotating the input shaft in a direction opposite to that produced by normal engine operation, said one-way brake comprising an annular coil spring and a plurality of sprags mounted thereon so as to be yieldingly displaceable between braking and released positions.

27. In combination, a slip-drive power-transmitting device, a driven shaft, disconnectible drive transmitting means drivingly connecting the slip-drive power-transmitting device with the driven shaft comprising driving and driven parts, and a one-way brake connected to the driving part of the disconnectible drive transmitting means so as to be operably controlled by the drive transmitting condition of said drive transmitting means, said one-way brake including a plurality of grippers and an annular coil spring extending therethrough.

WILLIAM T. DUNN.

REFERENCES CITED

The following references are of record in the file of this patent:

UNITED STATES PATENTS

| Number | Name | Date |
|---|---|---|
| 1,694,181 | Kaplon | Dec. 4, 1928 |
| 1,933,265 | Hunt | Oct. 31, 1933 |
| 2,049,798 | Booth et al. | Aug. 4, 1936 |
| 2,144,795 | Cotterman | Jan. 24, 1939 |
| 2,257,674 | Dunn | Sept. 30, 1941 |
| 2,386,013 | Swenson | Oct. 2, 1945 |